United States Patent [19]

Ling

[11] Patent Number: 4,603,237
[45] Date of Patent: Jul. 29, 1986

[54] AUTOMATIC CONNECTION AND DISCONNECTION OF CURRENT COLLECTORS FOR TROLLEY VEHICLES

[75] Inventor: Bernt Ling, Västerås, Sweden

[73] Assignee: Asea Aktiebolag, Västerås, Sweden

[21] Appl. No.: 709,199

[22] Filed: Mar. 7, 1985

[30] Foreign Application Priority Data

Mar. 8, 1984 [SE] Sweden ............................. 401294/84

[51] Int. Cl.⁴ ........................... B60L 5/16; B60L 5/38
[52] U.S. Cl. ....................................... 191/73; 191/78; 191/85
[58] Field of Search ................. 191/23 A, 45 A, 48, 191/57, 58, 72, 73, 77, 78, 82, 83, 85

[56] References Cited

U.S. PATENT DOCUMENTS

| | | | |
|---|---|---|---|
| 1,819,886 | 8/1931 | Frank et al. | 191/57 |
| 3,924,084 | 12/1975 | Lindfors | 191/45 A |
| 4,034,832 | 7/1977 | Lewis | 191/85 X |
| 4,205,736 | 6/1980 | Seidl et al. | 191/83 X |

FOREIGN PATENT DOCUMENTS 11409 2/1978 Japan ............................. 191/72

Primary Examiner—Robert B. Reeves
Assistant Examiner—David F. Hubbuch

Attorney, Agent, or Firm—Watson Cole Grindle & Watson

[57] ABSTRACT

Electrically powered trolley vehicles in headings of mines are provided with a current collector pick-up unit having contact-sensing means, current collectors, position sensors and guide wheels. The power supply for the pick-up unit comprises an array of elongated guide rails and at least two conductor bars. The connecting method comprises running the vehicle slowly forwards, by means of its own energy source, in the direction of the elongated conductor bars and vertically raising the pick-up unit by means of an arm mounted on the vehicle so that a contact-sensing frame for sensing contact in a vertical direction is brought into engagement with one or both of the guide rails. During a continued vertical movement, the contact-sensing frame is turned down towards the rest of the pick-up unit and when the contact-sensing frame reaches its lower end limit position, this is indicated by a position sensor. The pick-up unit is then turned in the lateral direction until contact-sensing bars for horizontal sensing are brought into engagement with the nearest guide rail. When the position sensors indicate this, the frame is lowered and the pick-up unit with its current collectors and guide wheels is raised towards the conductor array, whereby the current collectors are brought into contact with the conductor bars and the guide wheels are brought into contact with the guide rails.

7 Claims, 11 Drawing Figures

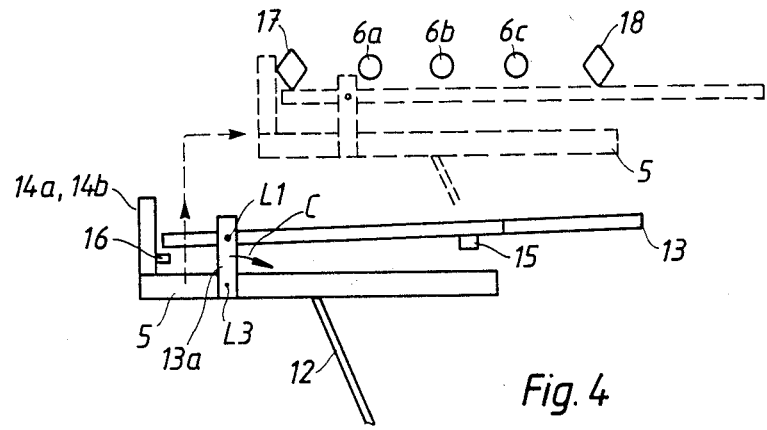
Fig. 4
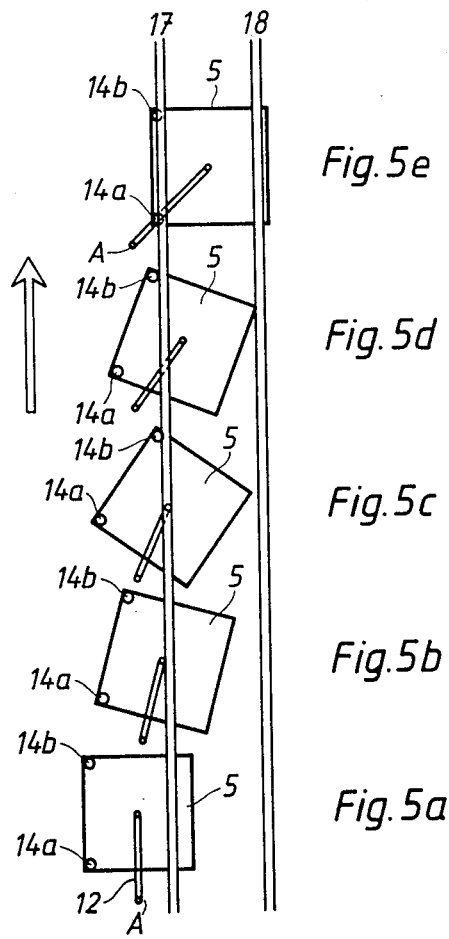
Fig. 5e
Fig. 5d
Fig. 5c
Fig. 5b
Fig. 5a

AUTOMATIC CONNECTION AND DISCONNECTION OF CURRENT COLLECTORS FOR TROLLEY VEHICLES

BACKGROUND OF THE INVENTION

1. Field of the Invention

When transporting ore and like bulk materials in a mine working, it is known to use electrically operated vehicles, so-called trolley vehicles. From a mechanical point of view, these may be designed as shown in FIG. 1 of the accompanying drawings) as a vehicle consisting of a traction unit 1 and a load-carrying unit 2, connected together via an arm 3 which is rigid in the vertical direction but rotatable in the lateral direction. An empty vehicle may have a weight of 30 tons and its load capacity may amount to 50 tons. Normally, the traction and load-carrying units are each provided with two wheels. The operation of the vehicle may take place by means of two electric motors, one in the traction unit and one in the load-carrying unit. The current supply to these motors normally takes place via a cable 4 and a current pick-up system 5 which includes one current collector for each of a plurality of conductors which, via isolators or otherwise, are suspended in a supply array 6 from the roof 7 of a heading in the mine.

The present invention relates to a method of and a device for automatically connecting and disconnecting the current collectors of a current pick-up system with current conductors of a supply array.

2. Description of the Prior Art

In the prior art arrangements, it is not at present possible to effect, in a simple manner, the connection of the current collectors of an electric trolley vehicle to the conductors of a supply array feeding it and located above the vehicle at any arbitrary location along the supply array. In the normal prior art arrangement connecting and disconnecting take place when the vehicle is stationary at special connection stations but otherwise connection/disconnection involves considerable mechanical work. One example of a known arrangement of a current collector pick-up system is illustrated in FIG. 2 of the accompanying drawings. In FIG. 2 the supply array 6 comprises four current collectors of which 8a, 8b and 8c constitute the phases of a three-phase supply to the vehicle and 8d constitutes a ground connection. The current collector pick-up system 5 is suspended from a guide rail 10 in the form of a T-bar and is guided thereon via wheels 9. The current supply from the current collector pick-up system to the trolley vehicle takes place via a mechanically reinforced cable 4 which at the same time hauls the current collector pick-up system 5 along the rail 10. The cable is suitably wound in a prestressed manner onto a cable winder 11 mounted on the vehicle. In such a design of current collector pick-up system, the system 5 is always guided via the wheels 9 engaging the guide rail 10. If the vehicle is driven in such a way that the mechanical stress in the current cable 4 becomes excessive, safety means is usually provided to effect a disconnection of the cable.

If the current collector pick-up system 5 as shown in FIGS. 1 and 2 should become jammed owing to downfalling ore, rock, and the like, this would involve an additional load on the cable winder 11 and the conductor cable 4 which, in an extreme case, might become torn away or disconnected, rendering the vehicle inoperable.

Other prior art arrangements are available but most of them are based on the principle described above and suffer from the same general disadvantages.

The connection between the current collector pick-up system and the suspension device, which—from the point of view of connecting and disconnecting—is, in principle, fixed in relation to the conductor system, undesirably restricts the freedom of movement of a trolley vehicle. In case of operational disturbances and faults of various kinds, it is desirable to be able to rapidly disconnect a vehicle from the supply array 6 and drive the vehicle away to some central collecting point or repair shop. A facility for easy connection/disconnection is thus highly desirable.

Because of the limited cross-section available in a mine heading, which in a typical case may amount to no more than about 25 $m^2$ (5×5 m), current collection via a pantograph system as used, for example, in trains and other railbound vehicles, cannot be used. Since the trolley vehicles under discussion are provided with insulating rubber wheels, the ground on which they run cannot be used as a return conductor. The smallest number of overhead conductors, in the case of DC supply, will be two and in the case of an AC supply it will be three. For a three phase AC supply four conductors are needed. Thus it is not practicable to use the current collector pantograph system developed for electric trains.

SUMMARY OF THE INVENTION

The invention relates to a method and a device for automatically connecting and disconnecting a current collector pick-up system with current collectors to the respective conductors of an overhead supply array independently of the location of the vehicle in the heading and when the vehicle is moving generally in the elongated direction of the array. The only demand that is imposed is that the vehicle, laterally of the said elongated direction, is within a certain maximum distance of the overhead array. The solution involves a new design concept in which the current collector pick-up system is pressed from below upwards towards the conductors of the supply array, e.g. using a hydraulically operated raisable and rotatable extension arm which supports a current collector pick-up in the form of a frame.

The invention relates to a method for positioning a current collector pick-up unit with a vertical contact-sensing frame, horizontal contact-sensing bars, a vertical position sensor, lateral position sensors, guide wheel indicators, guide wheels and current collectors with the aid of an arm mounted on a trolley vehicle. The method presupposes the existence of an array of conductors above the trolley vehicle consisting of conductor rails and guide rails. The method is characterized in that the trolley vehicle is positioned under the conductor system with the aid of its own energy source. While the vehicle is stationary or slowly runs forwards, the pick-up unit is raised by means of the arm towards the array of conductors so that the vertical contact-sensing frame is first brought into contact with one or both of the guide rails. During the continued vertical movement, the vertical contact-sensing frame is turned down towards the pick-up unit and when the frame has reached its lower limit position, this is indicated by the vertical position sensor. The current collector pick-up unit is then turned with the aid of the arm in the lateral direction until the horizontal contact-sensing bars are brought into contact with the nearest guide rail. When the two horizontal contact sensing bars have been brought into contact with the guide rail, this is indicated by the lateral position sensors. The vertical contact-sensing frame is now lowered down and the current collectors of the pick-up unit are brought into contact with the conductor rails while the guide wheels are brought into engagement with the guide rails.

BRIEF DESCRIPTION OF THE DRAWINGS

The invention will now be further described, by way of example, with reference to the accompanying drawings, in which:

FIG. 4 shows schematically, in side elevation, the procedure when positioning the pick-up unit against the conductor system, FIGS. 5a to 5e show, in plan, the pattern of movement of the pick-up unit during a connection operation according to the invention, FIG. 5a being an imaginary inital position, and FIG. 5e the final position.

DESCRIPTION OF PREFERRED EMBODIMENT

Figure 1:
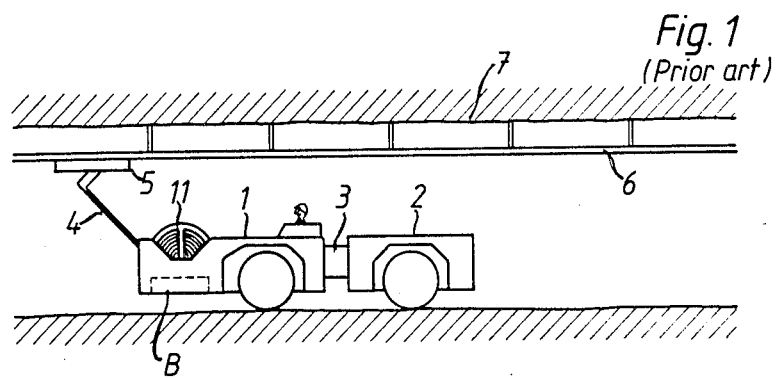
FIG. 1 shows a prior art trolley vehicle with a cable-connected current collector pick-up unit connected to a conductor system in the roof of a mine heading.

One embodiment of the positioning of the current collector pick-up unit 5 relative to overhead current conductors will now be described with reference to FIGS. 4 and 5. FIG. 4 shows the pick-up unit 5 seen from the front in the direction of movement of the vehicle and thus in the elongated direction of the overhead current conductors. The Figures show two guide rails 17 and 18 and between them (shown only in FIG. 4) three conductor rails 6a, 6b and 6c in the form of copper tubes. The conductor rails are attached at intervals, by means of insulating supports (not shown in the drawings), to the guide rails which in turn are attached to the roof of the heading.

The starting position for a connecting operation can be attained by driving the vehicle, powered by its own energy source B, into a position where the pick-up unit 5 is situated within the required distance range, in the lateral direction, of the conductor rails. The pick-up unit is then raised by means of the arm 12 so that the frame 13 comes into contact with one of the guide rails. In the case shown in FIG. 4, the frame 13 first contacts the guide rail 18. During continued vertical movement of the pick-up unit, the frame 13 is turned about its bearings L1 and L2 and when the frame reaches its fully pressed-down position, this is indicated by the vertical position sensor 15, whereby the vertical movement is stoppped mechanically by the guide rails 17 and 18. The frame 13 now contacts both guide rails 17 and 18. Should the connecting operation have started when the vehicle and the current collector pick-up unit, in the lateral direction, were situated further from the conductor rails, the contact-sensing frame 13 could, in its fully pressed-down position, contact only either the guide rail 17 or the guide rail 18, depending on which side of the overhead array the vehicle was located. However, the vertical movement pattern is otherwise the same as when the frame 13 comes into contact with both guide rails.

When the vertical movement has been mechanically interrupted, the pick-up unit is urged with a given preset upward pressure against the underside of the guide rail or guide rails and the pick-up unit is now situated with its contact-sensing frame in contact with the underside of one of or both of the guide rails so that the entire unit 5 can be displaced in the lateral direction without the current collectors thereof, coming into contact with the rails 17 or 18. The force with which the pick-up unit is urged upwards can constitute a minor part of the upwardly-directed force which is employed when the current collectors are in engagement with their respective conductor rails in the operating condition of the pick-up system.

Figure 6:
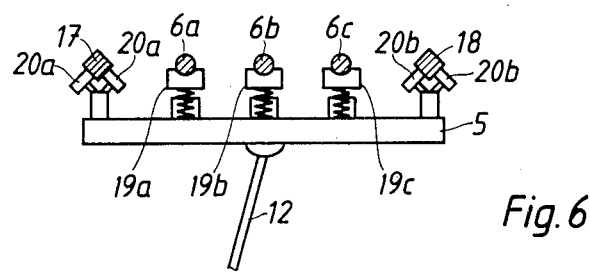
FIG. 6 shows in side elevation, a current collector pick-up unit correctly connected to an overhead conductor system consisting of conductor rails and guide rails.
Figure 7:
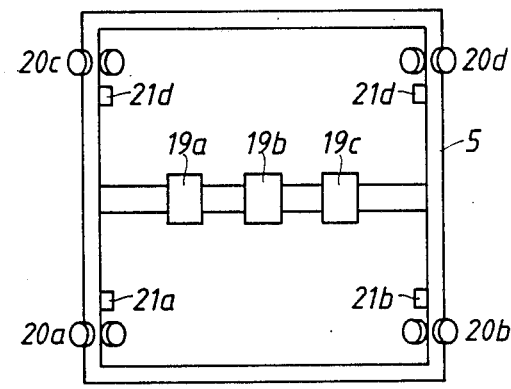
FIG. 7 shows the same current collector pick-up unit as FIG. 6 but seen from above.

The pick-up unit 5 now has to be moved in a horizontal direction until each current collector is positioned directly below its respective conductor rail and wheels 20 (see FIGS. 6 and 7) are directly below the respective guide rail. The movement pattern for the lateral movement of the pick-up unit will be clear from FIGS. 5a–5e which show successive stages of the lateral and turning movements. The arm 12 has its fixed center of rotation A on the vehicle which, during the positioning operation has been shown moving slowly forwards in the direction of the arrow. Such movement of the vehicle relative to the rails 17, 18 may not be required, however.

The lateral movement of the pick-up unit shown in FIGS. 5a–5e is automatically effected by rotating the arm 12 (in a clockwise direction as shown in the Figures). In FIG. 5c the arm has been rotated to such an extent that the horizontal sensing bar 14b of the pick-up unit has made contact with the guide rail 17. During the continued movement of the arm, the pick-up unit is turned somewhat so that, as shown in FIG. 5e, the other sensing bar 14a also comes into contact with the guide rail. The lateral position sensors 16a, 16b shown in FIG. 3 will indicate when both the sensing bars 14a and 14b are in contact with the guide rail.

The current collector pick-up unit 5 is now accurately positioned in the lateral direction and is disposed parallel to the array of conductor rails.

Figure 3:
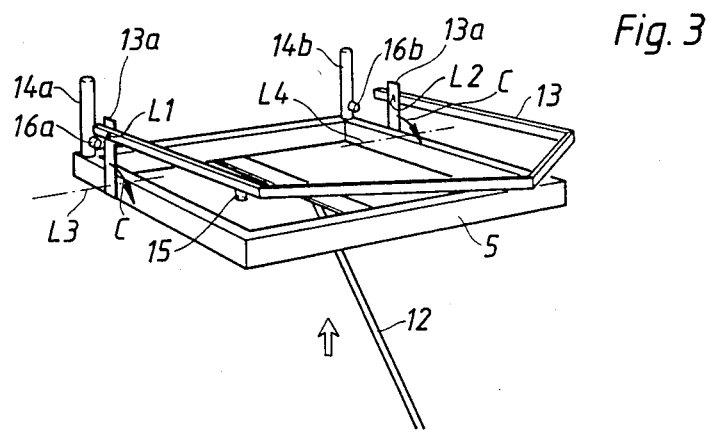
FIG. 3 shows the principle of a current collector pick-up unit in accordance with this invention, the current collectors and conductor arrangement not being shown.

FIGS. 3, 4 and 5 show the pick-up as a naked frame with a contact-sensing frame 13 and bars 14a and 14b. In addition, as is clear from FIGS. 6 and 7, the pick-up unit is provided with current collectors 19a, 19b and 19c and the guide wheels previously referred to and shown as 20a, 20b, 20c and 20d. For the sake of clarity, the contact-sensing means have been omitted in FIGS. 6 and 7.

When the pick-up unit is correctly positioned in the lateral direction, the contact-sensing frame 13 is retracted allowing the pick-up unit 5 to be raised a little higher so that the guide wheels 20 contact the guide rails 17 and 18 and the current collectors 19 make electrical contact with their respective conducting rails 6. When a signal is obtained from wheel indicators 21a–21d that the wheels are in rolling contact in the proper manner, the force generated by the arm 12 is increased so that the necessary upward force is achieved. The mechanical phase of the connection operation is now completed.

Before electrical power is fed to the drive system of the vehicle, the phase sequence, for example, is checked and also that the voltage lies within the prescribed limits. Thereafter, contactors, or the like, are operated, whereupon the vehicle can be run with its power supply coming from the overhead conductor array.

Connecting a current collector to its respective conductor in a supply array requires an accurate method of positioning as well as equipment for effecting it. To facilitate accurate positioning, the pick-up unit 5 of the current collector pick-up system (shown in FIG. 3) is provided with a contact-sensing frame 13 for vertical sensing, two horizontal contact-sensing bars 14a, 14b for horizontal sensing and, a vertical position sensor 15 and two lateral position sensors 16a, 16b. The frame 13 is rotatably journalled at L1 and L2 and during a connecting/disconnecting operation, serves as a protective device for the other means (e.g. current collectors) mounted on the pick-up unit 5. The frame 13 can be retracted in the direction of the arrows C in FIGS. 3 and 4 by turning supporting pillars 13a (that provide the journals L1 and L2) about axes L3, L4. In the operating position, the contact-sensing frame 13 is retracted so that the current collectors can engage the respective conductors and the lateral position sensors 16a, 16b are exposed. The correct positioning of the unit 5 is carried out in the following manner, the pick-up unit is raised with the aid of an extensible arm 12 so that the sensing frame 13 contacts at least one of the guide rails 17, 18 (see FIG. 4). The raising of the pick-up unit continues until the correct vertical height of the unit 5 has been achieved, this being sensed by the vertical position sensor 15. Thereafter, the pick-up unit is moved in the lateral direction by means of the arm 12 so that one of the contact-sensing bars 14a or 14b contacts the outer guide rail, whereafter any further lateral movement and/or rotation of the pick-up unit 5 continues until the other of the contact-sensing bars contacts the same guide rail. The pick-up unit is now accurately positioned, and this is indicated by the lateral position sensors 16a 16b, that is, one sensor for each of the bars 14a and 14b.

The frame shown in FIG. 3, lacks the current collectors and guide wheels which, via guide rails 17, 18 (see FIG. 4), maintain the pick-up unit in its correct position relative to the conductors of the overhead supply array when the vehicle is moved in the mine heading. This part will be described in greater detail in connection with the description of an embodiment.

By providing the vehicle shown in FIG. 1 with a chargeable energy source (shown dotted at B), for example electrical batteries, the vehicle may be driven under its own power to a position where, in the lateral direction, it is within the specified maximum deviation from the conductors of the overhead supply system. After this possible positioning of the vehicle, in response to an appropriate initiating action, an operating sequence, as described above, is followed, by means of which the connection of the pick-up unit 5 to the supply array is effected.

Since the floor of the heading may be very uneven and there may be rocks and other obstacles in the way of the vehicle, the vehicle 1, 2, the arm 12, the pick-up unit 5 and the current collectors thereon are all desirably constructed with appropriate resilient suspension means so that the pick-up unit and its current collectors will always be held in good electrical contact with the conductors of the supply array.

The advantages of a method and a device according to the invention are several and obvious.

The arm 12 constitutes a much safer and more reliable coupling between the vehicle 1 and the pick-up unit 5 than a reinforced current cable 4 as shown in FIG. 1. The current collector cable associated with the arm 12 will not be subjected to any significant mechanical tension since the pick-up unit 5 is fully supported by the arm.

Figure 2:
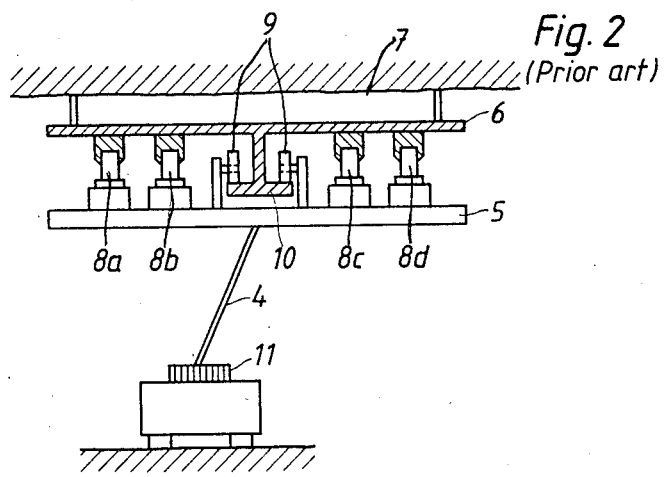
FIG. 2 shows one known prior art embodiment of a current collector pick-up unit with its current collectors.

It will be appreciated therefore that the connecting and disconnecting of a current collector pick-up system with current-carrying conductors of an overhead array will be considerably simpler than is the case with the available designs shown in FIGS. 1 and 2.

Further advantages are that the connecting and disconnecting may take place at any convenient location along a mine heading, that the connecting and disconnecting may take place when the vehicle is moving forwards and that the time required for the connecting and disconnecting will be considerably shorter than with existing designs and systems.

The method employed during normal intentional disconnection of the pick-up unit from the current conductors comprises pulling the pick-up unit 5 downwards with the arm 12 while at the same time the contact-sensing frame 13 is raised into contact with the guide rails 17, 18. The pick-up unit is thereby pressed with an additional force downwards, whereby the contact between the current collectors 19 and the conductor rails 6 is broken. The arm 12 and the pick-up unit 5 are then lowered further until a convenient lowered rest position has been obtained.

In view of the expected unevenness on the floor of a mine heading, the hydraulic system of the arm 12 should be able to hold the current collectors in the pick-up unit in good contact with the conductor rails of the roof array.

In the event of an abnormal unevenness in the floor path and when the vehicle is unintentionally driven too far away from the conductor rails, in the lateral direction, there is a risk of the pick-up unit being disconnected from the conductor array, in which case the connection of the conductor rail system to the current collectors may become open-circuited. This may lead to arcing and localized melting either of the conductor rail array or of the current collectors or both. To prevent this occurrence, the guide wheel indicators 21 can be located at each pair of guide wheels, and can be used to indicate when any of the wheel pairs shows a tendency of losing its contact with the respective guide rail. When any of the guide wheel indicators 21a, 21b, 21c or 21d indicates that the pick-up unit is about to lose its proper contact with the conductor array, the current supply to the vehicle can be interrupted (e.g. with the aid of the previously mentioned contactors), thus preventing arcing and burning of the conductor rails of the array and the current collectors of the pick-up unit. When loss of wheel contact is indicated, the contact-sensing frame 13 is also raised, whereby the pick-up unit is pressed down. At the same time, the pick-up unit can be lowered with the aid of the arm 12, that is, a normally ordered disconnection operation can be automatically initiated.

After the vehicle has been run, by means of its own energy source past the very uneven floor area and/or has driven back close enough to the overhead array to permit reconnection, a new connection operation can be initiated.

The equipment for carrying out the method of the invention can be arranged in many ways in addition to that described above. For example, it is possible to make only those parts of the contact-sensing frame 13 which are positioned at right angles to the array of conductor rails—i.e. those parts which have to be retracted to allow the guide wheels and current collectors to respectively contact the guide rails and the conductor rails—raisable and lowerable whereas the other parts of the frame 13 which do not prevent such contact can be made fixed. Although a simple pivoting mounting of the supports 13a, 13b has been illustrated in FIGS. 3 and 4, it should be appreciated that a telescopic arrangement can be used on these supports and indeed other ways of retractably mounting the frame 13 employed.

The movements of the arm 12, the pick-up unit 5 and the contact-sensing frame 13, which are initiated by a normal order or in cooperation with the different position sensors, can be activated with known mechanical, hydraulic or pneumatic members. The movement sequences, which comprise the various steps taken during connection, normal disconnection and emergency disconnection when the pick-up unit is about to leave the conductor system because the floor is too uneven or because of too wide steering of the vehicle, can be programmed in a known manner. The programming may be performed in a conventional manner by means of relay sequences or in the form of a computer controlled program. Such a programming also comprises the purely electrical functions such as phase control, switching in and out, etc.

The method described above with reference to the drawing can be varied in many ways within the scope of the following claims.

What is claimed is:

1. A method of effecting electrical contact between at least two current collectors of a current pick-up unit of a vehicle and respective elongated conductors of an overhead current supply array, the pick-up unit being supported from the vehicle by an extensible arm, the supply array including a pair of elongated guide rails between which the elongated conductors are located and the pick-up unit including respective guide wheels to engage each of the said guide rails during correct contact between the said unit and the said array, and respective vertical and horizontal contact-sensing means, which method includes the steps of raising the pick-up unit with the said arm so that the vertical contact-sensing means of the pick-up unit contacts at least one of said guide rails, moving the pick-up unit transversely of the elongated direction of the conductors until the horizontal contact-sensing means contacts a guide rail and indicates the vertical contact-sensing means is contacting both said guide rails, and moving the pick-up unit further upwards to effect guide wheel contact with both guide rails and current collector contact with each respective elongated conductor.

2. A method according to claim 1, in which there are two horizontal contact-sensing means, each of which has to contact a guide rail to allow the final upward movement of the pick-up unit to be performed.

3. A method according to claim 2, in which the vertical contact-sensing means is a frame with means to retract the frame away from the guide rails to allow the final upward movement of the pick-up unit to be performed.

4. A method of effecting disconnection of the said electrical contact between respective collectors/conductors following a connection as claimed in claim 3, wherein the initial movement of the pick-up unit away from the guide rails is occasioned by extending the said contact-sensing frame upwardly towards said guide rails.

5. A method according to claim 2, in which sensing means is provided to indicate a reduction in the contact pressure of any guide wheel on its respective guide rail, and said sensing means is employed to indicate that a current collector is on the verge of losing its contact with the respective elongated conductor.

6. A method according to claim 5, in which an automatic disconnecting operation of the current collectors from the conductors is initiated when the said sensing means indicates a loss of contact is occurring.

7. A device for positioning a current collector pick-up unit having a vertical contact-sensing frame, horizontal contact-sensing bars, a vertical position sensor, lateral position sensors, guide wheel indicators, guide wheels and current collectors, the pick-up unit being supported on an arm mounted on a trolley vehicle movable below a conductor system including at least two conductor rails and two guide rails, characterized in that the vertical contact-sensing frame is rotatably journalled in the pick-up unit and is also raisable and lowerable relative to the remainder of the pick-up unit and is provided with a vertical position sensor, the horizontal contact-sensing bars being fixedly mounted on one side of the pick-up unit which is intended, when the pick-up unit is correctly positioned in use, to be parallel to the guide rails, each of the horizontal contact-sensing bars being arranged with a lateral position sensor, the guide wheels being arranged on the rest of the pick-up unit in such a way that they may contact pairwise with the respective guide rail during correctly positioned use, each one of the pairs of guide wheels being provided with a guide wheel indicator for indicating that the guide wheels are in contact with the guide rail, the current collectors being located on the rest of the pick-up unit in such a way that, when the pick-unit is correctly positioned relative to the guide rails, each current collector makes contact with its respective conductor rail of the conductor system.

* * * * *